United States Patent [19]

Owens

[11] Patent Number: 4,944,995
[45] Date of Patent: Jul. 31, 1990

[54] TAPE HAVING A SURFACE WITH A LOW COEFFICIENT OF FRICTION AND LONG WEAR CHARACTERISTICS

[75] Inventor: John C. Owens, Arvada, Colo.

[73] Assignee: Storage Technology Corporation, Louisville, Colo.

[21] Appl. No.: 166,257

[22] Filed: Mar. 10, 1988

[51] Int. Cl.$^5$ .................... B32B 15/08; B32B 27/36
[52] U.S. Cl. .................... 428/294; 428/188; 428/343; 428/412; 428/458; 428/480; 428/900; 428/906
[58] Field of Search .............. 428/188, 343, 412, 344, 428/906, 458, 480, 900, 294; 524/547

[56] References Cited

U.S. PATENT DOCUMENTS

| | | | |
|---|---|---|---|
| 3,228,822 | 1/1966 | Norman | 428/188 |
| 3,386,527 | 6/1968 | Daubert et al. | 428/906 X |
| 3,517,805 | 6/1970 | Gould | 428/906 X |
| 4,223,053 | 9/1980 | Brogan | 428/188 X |
| 4,443,510 | 4/1984 | Watt | 428/354 X |
| 4,671,983 | 6/1987 | Burt | 428/906 X |
| 4,753,841 | 6/1988 | Noel et al. | 428/188 X |

Primary Examiner—Thomas J. Herbert
Attorney, Agent, or Firm—Dorr, Carson, Sloan & Peterson

[57] ABSTRACT

The tape having a surface with a low coefficient of friction consists of a conformable substrate manufactured of polycarbonate or mylar. Rods of alumina, having cylindrical cross section, are adhesively bonded to the substrate. These rods are parallel to each other, spaced apart at regular intervals and oriented lengthwise across the narrow dimension of the tape. The cylinders of alumina are tapered at both ends so that there is a smooth transition at either edge of the tape. The cylinders of alumina having a very low coefficient of friction and an extremely long lifetime, to thereby provide a surface with a low coefficient of friction for the tape transport path of a magnetic tape drive.

7 Claims, 1 Drawing Sheet

Fig. 1
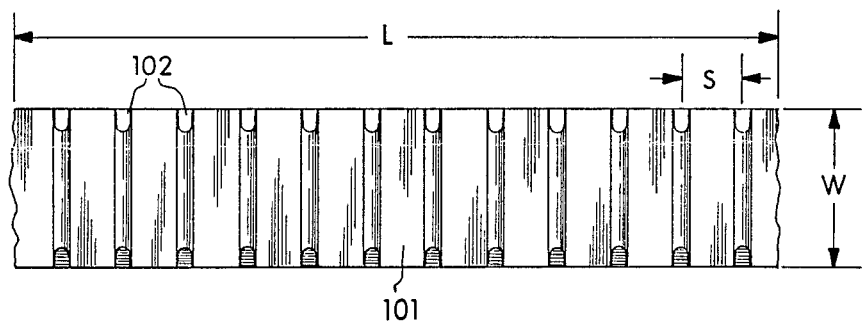
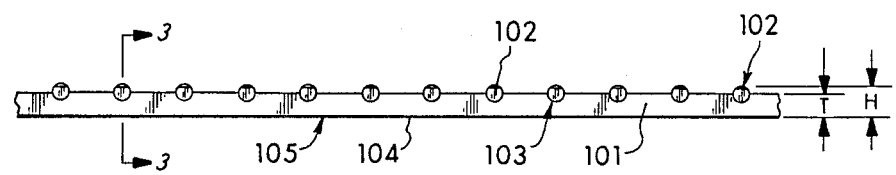
Fig. 2
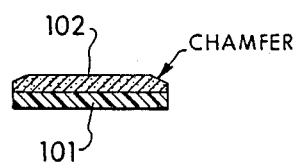
Fig. 3

TAPE HAVING A SURFACE WITH A LOW COEFFICIENT OF FRICTION AND LONG WEAR CHARACTERISTICS

FIELD OF THE INVENTION

This invention relates to adhesive backed tapes and, in particular, to an adhesive backed tape that provides a surface with a low coefficient of friction and long wear characteristics.

PROBLEM

It is a problem in magnetic tape drives to provide surfaces in the tape transport path that do not cause excessive wear on the magnetic tape that rides on these surfaces. The tape transport path in the magnetic tape drive contains a number of surfaces on which the magnetic tape rides as it traverses the path from the file reel past the read/write heads to the take-up reel. Each of these surfaces that come in contact with the magnetic tape cause wear on the magnetic tape thereby shortening the useful life of the magnetic tape.

In the past, an adhesive backed glass bead tape has been used to provide a surface that has a low coefficient of friction for the magnetic tape. This adhesive backed glass bead tape was affixed to various surfaces in the tape transport path to reduce the friction between the magnetic tape and the surfaces. A problem with the glass bead tape is that this tape has a short lifetime and in its failure mode damages the magnetic tape that it was intended to protect. In addition, it is difficult to remove the installed adhesive backed glass bead tape and replace it with a new adhesive backed glass bead tape. This replacement operation requires that the tape transport be taken out of service and a significant amount of maintenance time be expended in order to replace the worn out adhesive backed glass bead tape. Thus, the adhesive backed glass bead tape provides an improvement over the underlying metal surfaces of the tape transport path on which the magnetic tape rides but the adhesive backed glass bead tape has practical limitations.

SOLUTION

The above mentioned problems are solved and a technical advance achieved in the field by the tape having a surface with a low coefficient of friction of the present invention. This tape is an adhesive backed tape manufactured of a polycarbonate substrate. The surface having the low coefficient of friction is implemented by bonding regularly spaced cylinders of alumina to the surface of the polycarbonate or mylar substrate. These cylinders of alumina are spaced in parallel at regular intervals along the length of the polycarbonate or mylar substrate. The cylinders of alumina are tapered at either end so that a smooth transition is provided along either edge of this tape. The cylinders of alumina have a very low coefficient of friction and are much harder than glass so that this tape does not need to be replaced for the life of the tape drive and will not damage the magnetic tape by failing in service.

BRIEF DESCRIPTION OF THE DRAWING

FIG. 1 illustrates a top view of the tape;
FIG. 2 illustrates a front view of the tape;
FIG. 3 illustrates a cross sectional view of the tape and the cylinders of alumina.

DETAILED DESCRIPTION OF THE DRAWING

FIG. 1 illustrates a top view of the tape having surface with a low coefficient of friction. FIG. 2 illustrates a front view of the tape shown in FIG. 1. This tape consists of a substrate 101 manufactured from a conformable material and of width W and thickness T to which is affixed a plurality of elements 102 that have a low coefficient of friction. These elements illustrated in FIGS. 1 and 2 consist of a plurality of rods 102 spaced at regular intervals S and parallel with each other along the length L of the substrate 101. Substrate 101 consists of a comformable material such as polycarbonate or mylar material which is a standard material used for the construction of tape. Elements 102 having the low coefficient of friction are affixed to substrate 101 by the use of an adhesive such as versaloc 202. The low coefficient of friction elements 102 consist of cylindrical rods of alumina. These cylindrical rods have a low coefficient of friction and are spaced sufficiently close together along the length L of substrate 101 so as to provide a surface along which the magnetic tape travels.

The cylindrical rods 102 are coated with the adhesive 103 and applied to the surface of the polycarbonate or mylar substrate 101. The cylindrical rods 102 are thereby bonded to the surface of substrate 101 to provide an integral tape of effective thickness H to which an adhesive backing 105 can be applied along surface 104. This adhesive backing is used to affix the tape to a surface in the tape transport over which the magnetic tape must pass. The spacing S of the cylindrical rods 102 along the length L of substrate 101 is a function of the radius of curvature of the surface to which the tape must be affixed. Thus, a fairly flat or gently curving surface would not require a close spacing of the plurality of cylindrical rods 102 since the magnetic tape would easily ride on the surface provided by the plurality of cylindrical rods 102. If the surface to which the tape is affixed has a low radius of curvature then cylindrical rods 102 must be placed fairly close together so that the magnetic tape will ride on the cylindrical rods 102 without impinging on substrate 101 when the tape is affixed to the sharply curving surface.

FIG. 3 illustrates a cross sectional view of a cylindrical rod 102 affixed to substrate 101. Cylindrical rod 102 has chamfered ends so that there is a smooth transition from rod 102 to the edge of substrate 101. This prevents damage to the tape as it is transported along the surface provided by cylindrical rods 102 in the event that the magnetic tape should become misaligned and ride over the edge of cylindrical rod 102. Thus, the low coefficient of friction provided by the alumina cylindrical rods can be used to provide a tape having a surface with a low coefficient of friction by the periodic and regular spacing S of the cylindrical rods 102 of alumina along the length L of the substrate. While cylindrical rods are illustrated in FIGS. 1 to 3, any smoothly contoured surface, such a rod having an elliptical cross section, would provide the same functionality as the cylindrical rods illustrated in FIGS. 1 through 3.

While a specific embodiment of this invention has been disclosed herein, it is expected that those skilled in the art can design other embodiments that from this particular embodiment but fall within the scope of the appended claims.

I claim:

1. A tape having a low friction surface comprising:

substrate means manufactured from a conformable elongated material of the group including: polycarbonate or mylar, and having first and second sides;

a plurality of alumina rods, the surface of which has a low coefficient of friction, attached to said first side of said substrate means at a predetermined spacing for providing said first side of said substrate means with a low friction surface.

2. The tape of claim 1 further including:
means for adhesively affixing said plurality of rods to said first side of said substrate means.

3. The tape of claim 1 wherein said substrate means comprises a conformable material of substantially rectangular shape.

4. The tape of claim 1 wherein said rods are parallel to each other, spaced apart at regular intervals and oriented lengthwise across the narrow dimension of said substrate means.

5. The tape of claim 1 wherein said rods are cylindrically shaped and have tapered ends.

6. The tape of claim 1 including:
adhesive means affixed to said second side of said substrate means for attaching said low friction tape to a surface.

7. A tape having a low friction surface comprising:
substrate means of substantially rectangular shape and manufactured from a conformable material of the group including: mylar, polycarbonate;

a plurality of rods of cylindrical cross section manufactured from alumina;

means for adhesively affixing said plurality of rods to one surface of said substrate means in parallel orientation to each other and at regularly spaced intervals along the long dimension of said substrate means;

adhesive means affixed to the opposite side of said substrate means from said plurality of cylindrical rods for attaching said tape to a surface.

* * * * *